US005544402A

United States Patent [19]

O'Neil

[11] Patent Number: 5,544,402

[45] Date of Patent: Aug. 13, 1996

[54] AXLE PULLER

[76] Inventor: William B. O'Neil, P.O. Box 1144, Fort Morgan, Colo. 80701

[21] Appl. No.: 372,972

[22] Filed: Jan. 17, 1995

[51] Int. Cl.$^6$ .......... B23P 19/04

[52] U.S. Cl. .......... 29/261; 29/275

[58] Field of Search .......... 29/254, 255, 275, 29/256, 258–264

[56] References Cited

U.S. PATENT DOCUMENTS

| | | | |
|---|---|---|---|
| 724,818 | 4/1903 | Crane . | |
| 1,354,271 | 9/1920 | Albrecht . | |
| 1,599,738 | 9/1926 | Atkins . | |
| 1,601,752 | 10/1926 | Wortham . | |
| 1,640,904 | 8/1927 | Noble . | |
| 1,683,188 | 9/1928 | Howell . | |
| 1,708,355 | 4/1929 | Chipman . | |
| 1,865,420 | 6/1932 | Kick . | |
| 2,370,482 | 2/1945 | Morgan et al. . | |
| 2,953,846 | 9/1960 | Wagner . | |
| 3,025,595 | 3/1962 | Stafford . | |
| 3,571,887 | 3/1971 | McIntire | 29/256 |
| 4,019,233 | 4/1977 | Jirele | 29/261 |
| 4,429,447 | 2/1984 | Davis | 29/262 |
| 4,965,921 | 10/1990 | Priest . | |
| 5,261,149 | 11/1993 | Sutton | 29/261 |

FOREIGN PATENT DOCUMENTS

| | | | |
|---|---|---|---|
| 739367 | 1/1933 | France | 29/261 |

*Primary Examiner*—Robert C. Watson
*Attorney, Agent, or Firm*—Lee R. Osman; Holland & Hart LLP

[57] ABSTRACT

An axle puller comprising a main body having circumferentially spaced bores, each bore corresponding to a lug bolt on the hub, a plurality of elongated pushrods adjustably located within the bores, and hook-arms pivotally mounted on the main body to engage the axle plate. The pushrods engage a corresponding lug bolt during application of the axle puller, and in conjunction with the pushrods apply an extraction force to the axle plate around each of the lug bolts, thus biasing the main body axially away from the axle plate. The hook-arms snap-fit onto the axle plate when the axle puller is mounted onto the wheel assembly. Stop bolts fix the hook-arms when engaged with the axle plate to keep the hook-arms from slipping off the axle plate. A spring-biased center-driver is provided to impact the axle plate after the extraction force has been applied.

6 Claims, 6 Drawing Sheets

AXLE PULLER

BACKGROUND OF THE INVENTION

1. Field of the Invention

The present invention concerns an axle puller for removing an axle from a wheel assembly, and more particularly concerns an axle puller that applies an extraction force on each of the lug bolts of a wheel assembly.

2. Description of the Prior Art

The problems with removing an axle from a wheel assembly are well documented. The axle is typically an elongated shaft having an axle plate mounted perpendicularly to one end. The plate has a plurality of circumferentially spaced holes formed therein. The wheel assembly typically includes, in addition to the axle, a hub portion attached to an elongated tubular shaped axle housing. The hub and axle housing define an axial cylindrical cavity. When the axle is positioned in the wheel assembly, the shaft fits axially into the cylindrical cavity through the center of the hub and the axle housing. The axle plate butts up against the hub which has a plurality of lug bolts extending generally axially outwardly therefrom and through the holes in the axle plate. Often times conical washers are used between the lug bolts and the axle plate to facilitate a tight connection of the axle plate to the hub. Standard nuts are used on the lug bolts to tighten the axle plate against the hub.

During use, the axle plate and lug bolts are exposed to weather elements, and also to severe stresses caused by acceleration and braking. The exposure to weather can cause the lug bolts to rust in place in the axle plate, or can cause the conical washers to become fixed within the holes and to the lug bolts because of rust. Also, the stresses experienced by the wheel housing and axle combination during use can cause the lug bolts or conical washers to become deformed. In any case, the axle becomes "frozen" to the wheel assembly and is difficult to remove therefrom.

A common technique of removing the axle from the wheel assembly is to percussively impact the end of the axle after the lug nuts have been removed. A sledge hammer is often used to impact the end of the axle, resulting in loosening the axle from within the wheel assembly. The impact can also severely damage the axle plate and the stud bolts. This impact also causes uneven stress to be placed on the different parts of the wheel assembly and axle, thus sometimes causing further damage to the axle or wheel assembly.

Several devices have been developed in order to address the problems associated with removing an axle from an wheel assembly. U.S. Pat. No. 1,865,420 issued to Kick describes a hub puller for pulling a hub off an axle using a flanged structure to grip the wheel while applying a retraction force by tightening a pair of laterally opposed bolts. Hammer blows to an end piece are used to jar the hub off the axle.

U.S. Pat. No. 3,025,595 issued to Stafford describes an axle puller that fits between the axle plate and the hub. The axle puller has threaded portions which, upon turning, extract the axle from the hub.

U.S. Pat. No. 1,601,752 issued to Wortham describes a pulling apparatus utilizing a pair of grip arms to secure the body to be pulled, and also has a center shaft which upon turning applies a force to the centerpiece and subsequently extracts the body from the centerpiece.

U.S. Pat. No. 1,599,738 issued to Atkins describes a bushing puller which utilizes grip arms to engage the bushing, and also leveling screws to ensure the bushing is being retracted in the proper orientation. The grip arms are held in position by a gear tooth engagement with a central shaft. The central shaft is threaded, and thus when rotated applies a force to the bushing shaft to extract the bushing.

U.S. Pat. No. 4,965,921 issued to Priest describes an axle puller with an elongated main body with two arms adjustably extending from both ends of the main body. The distal end of each of the arms has a wide portion which engages a back side of the axle flange. The arms adjust to cause the main body of the axle puller to engage two diametrically opposed lug bolts mounted on the hub. The engagement of the main body with the lug bolts biases the axle plate towards the main body and away from the wheel assembly. A center shaft runs through a bore at the center of the main body for use in striking the end of the axle to cause an impact and jar the axle loose from the hub.

The prior art does not describe an axle puller which remains easily mounted on the hub during application of the axle puller, and also applies an even extraction force on each of the lug bolts to help ensure complete separation of the axle from the wheel assembly without causing any damage to the axle or hub during removal. The "frozen" connection between the axle and the hub caused by physical deformation or exposure to weather elements could be strong enough that the use of prior art tools to remove the axle could damage the axle, wheel assembly, or the tool itself.

SUMMARY OF THE INVENTION

The axle puller of the present invention provides functionality that overcomes the aforementioned problems with prior art systems. The axle puller comprises a main body having a plurality of axially aligned, circumferentially spaced bores, each corresponding to a lug bolt on the hub. A plurality of elongated pushrods are slidably located within the bores and are adjustable in the axial direction. The pushrods engage a corresponding lug bolt during application of the axle puller, and bias the main body axially away from the axle plate.

A plurality of hook-arms are pivotally mounted on the main body to engage the axially inner side of the axle plate, and in conjunction with the pushrods apply an extraction force to the axle plate around each of the lug bolts. The hook-arms are resiliently biased to a radially inner position to cause them to snap-fit onto the axle plate when the axle puller is mounted on the wheel assembly. Stop bolts are employed to fix the hook-arms when engaged with the axle plate to keep the hook-arms from slipping off the axle plate.

The axle puller also includes a spring biased center-driver for percussively impacting the axle plate after the extraction force has been applied. The center-driver, upon impact with the axle plate, provides the necessary force to break the restraining bond between the axle plate and the lug bolts to allow the removal of the axle plate from the wheel assembly.

Accordingly, it is a primary object of the present invention to provide a new and improved axle puller that operates to effectively and efficiently remove an axle from a wheel assembly.

It is another object of the present invention to provide a new and improved axle puller that applies an extraction force equally to all lug bolts to help effectuate the removal of an axle from a wheel assembly.

Still another object of the present invention is to provide a new and improved axle puller that easily mounts onto the wheel assembly to allow simple operation.

Other aspects, features and details of the present invention can be more completely understood by reference to the following detailed description of a preferred embodiment, taken in conjunction with the drawings, and from the appended claims.

DESCRIPTION OF THE PREFERRED EMBODIMENT

Figure 1:
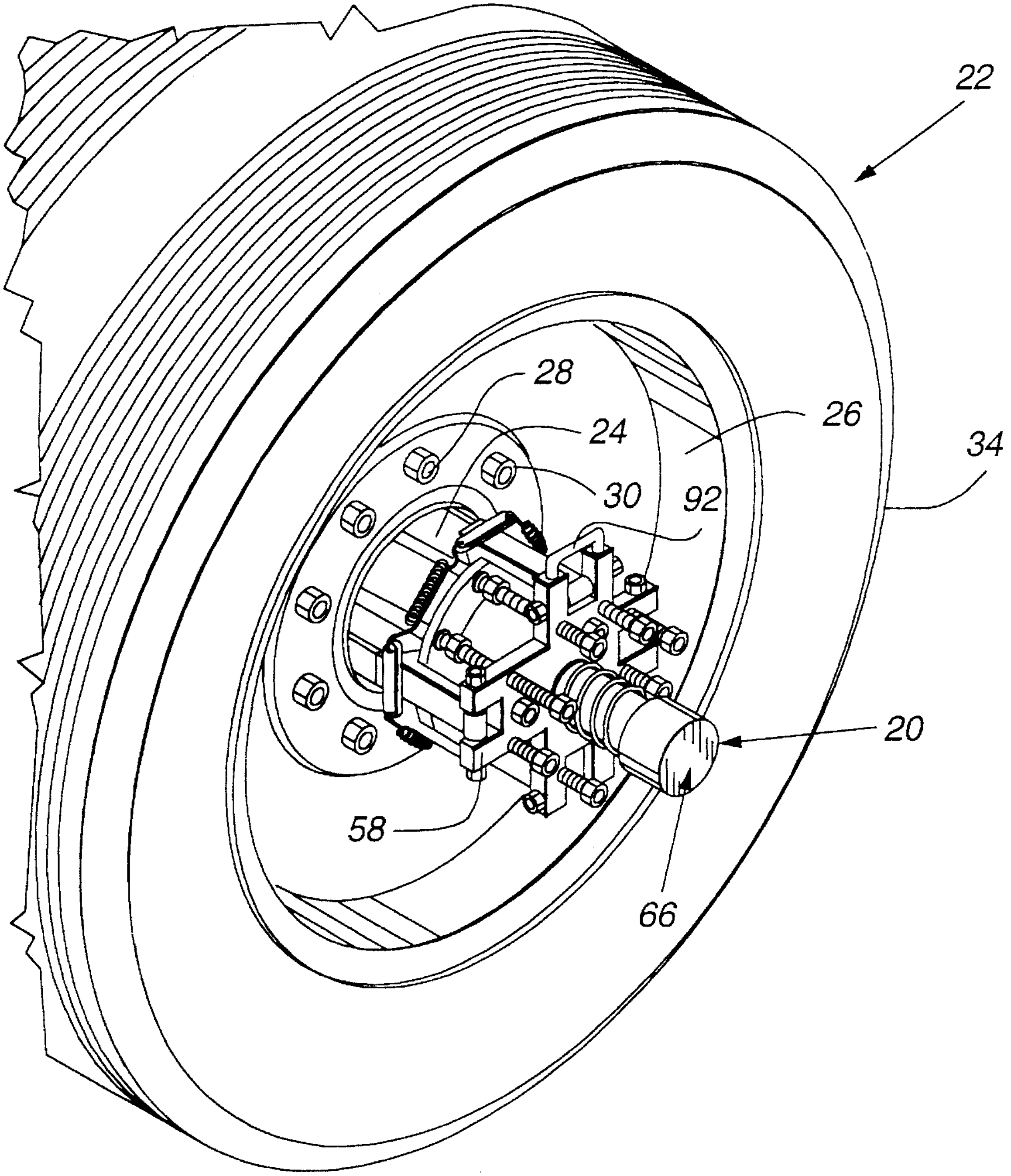
FIG. 1 is an isometric view of the axle puller of the present invention mounted on a wheel assembly.
Figure 2:
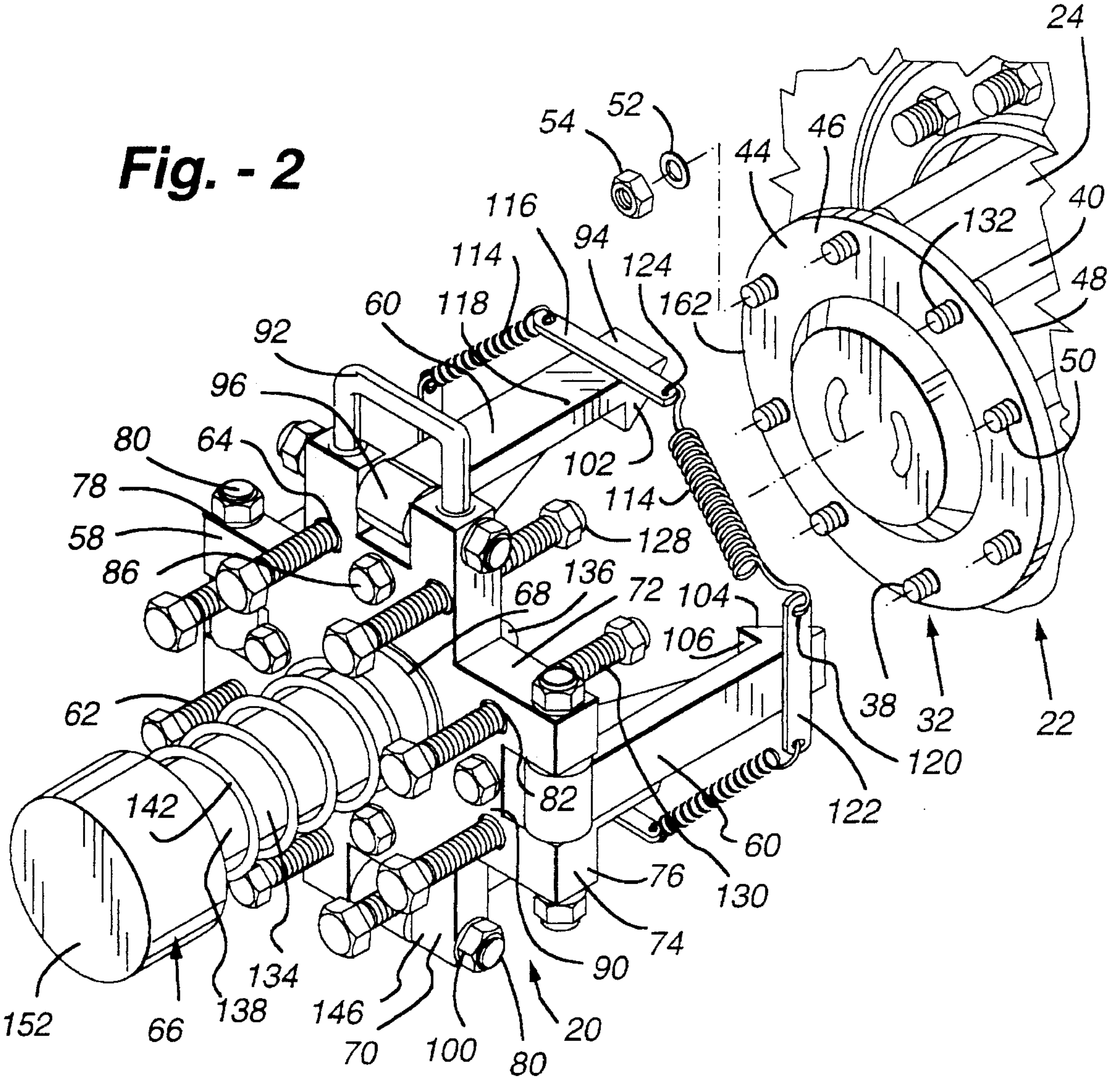
FIG. 2 is an enlarged isometric view of the present invention just prior to mounting on a wheel assembly.
Figure 5:
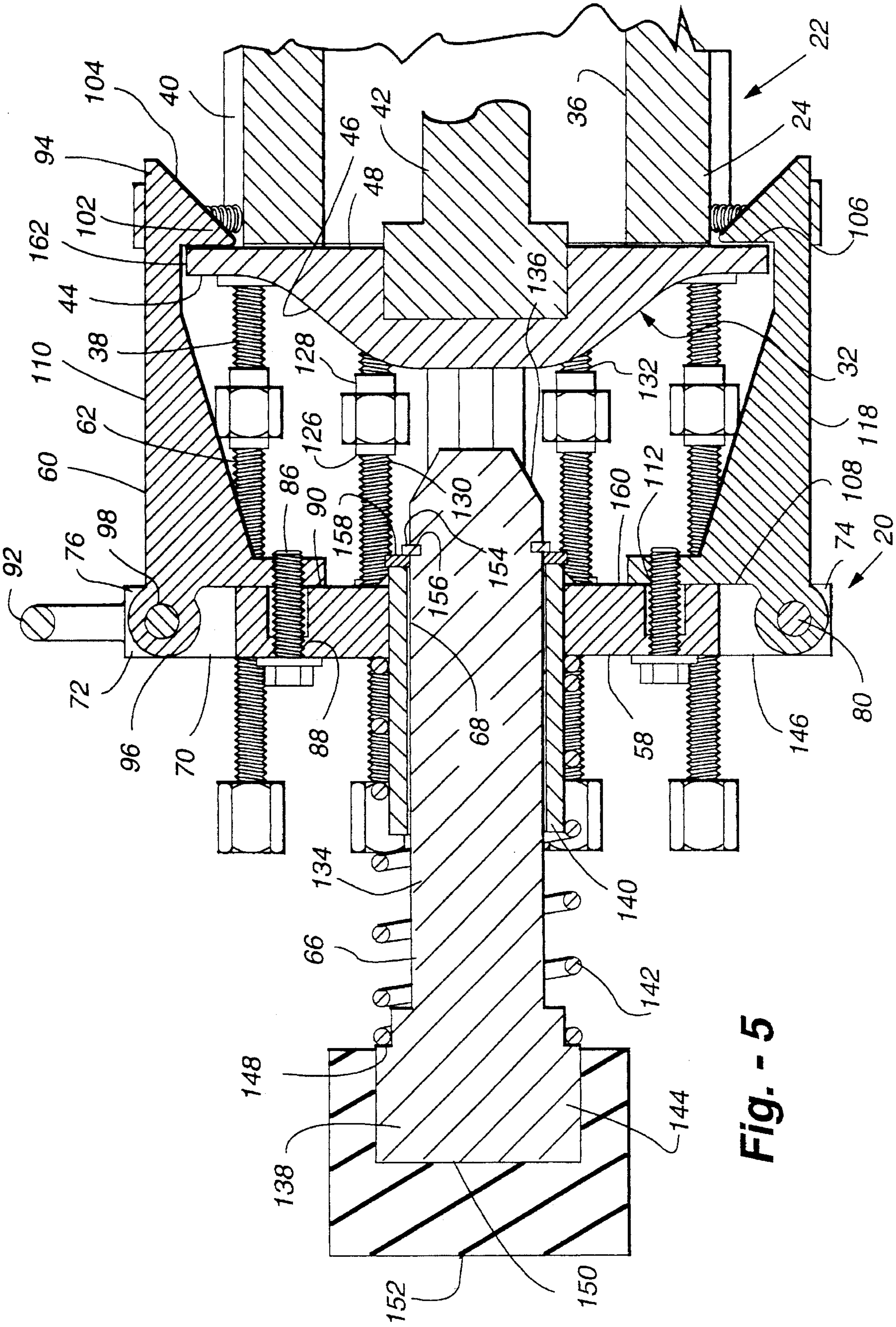
FIG. 5 is a section taken substantially in the plane of line 5—5 of FIG. 4.
Figure 6:
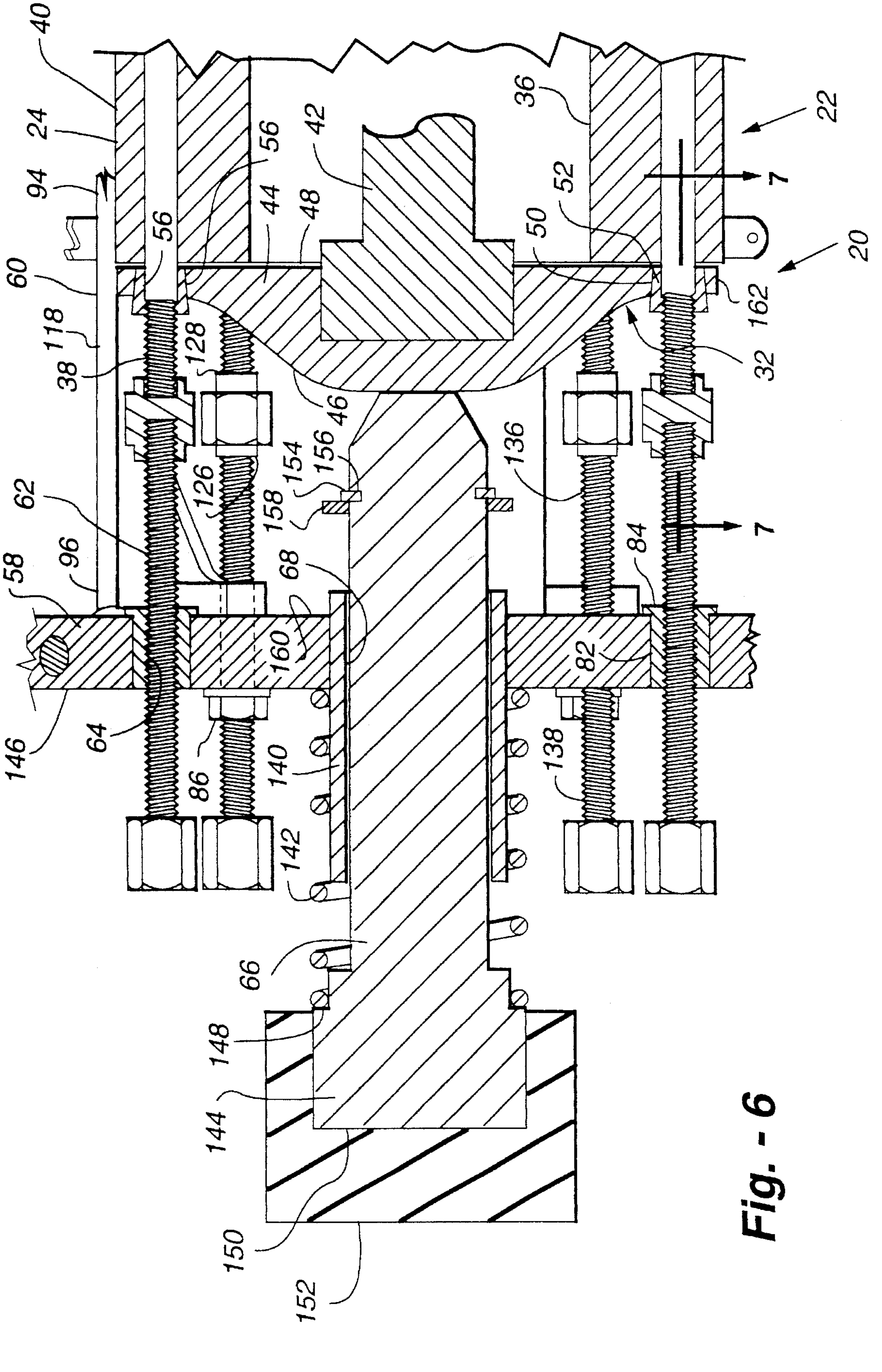
FIG. 6 is a section taken substantially along the plane of line 6—6 of FIG. 4.

Referring first to FIG. 1, the axle puller 20 of the present invention is illustrated mounted on a wheel assembly 22 of a conventional motor vehicle. The wheel assembly, as also seen in FIG. 2, typically comprises a hub portion 24 attached to an elongated tubular shaped axle housing (not shown). A tire rim 26 is releasably secured to the hub by a plurality of tire lug bolts 28 fixed to the hub, and corresponding lug nuts 30, allowing the hub to drive the tire rim in rotation about an axle 32. A tire 36 is mounted on the tire rim. The hub 24 and axle housing (not shown) define an axial cylindrical cavity 36 extending continuously therethrough, as shown in FIGS. 5 and 6. The hub has a plurality of hub lug bolts 38 affixed thereto in raised bosses 40, which extend generally axially outwardly therefrom.

Figure 8:
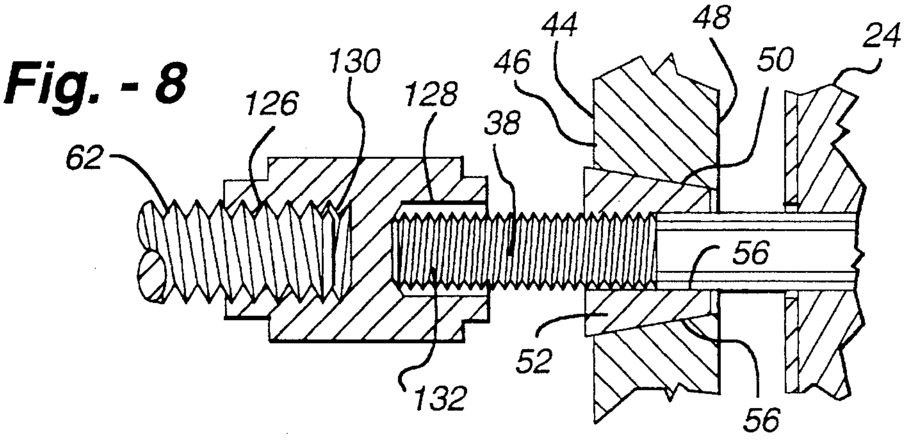
FIG. 8 is a section similar to FIG. 7, showing the axle plate separated from the wheel assembly.

The wheel assembly additionally includes an axle 32, generally comprising an elongated axle shaft 42 having an axle plate 44 mounted perpendicularly to one end. The axle plate has an axially outwardly facing side 46, and an axially inwardly facing side 48. A plurality of circumferentially spaced apertures 50 are formed in the axle plate. When the axle is positioned in the wheel assembly 22, the axle shaft fits axially into the cylindrical cavity 36 through the center of the hub 24 and the axle housing. The axially inwardly facing side 48 of the axle plate butts up against the hub 24 at which time the plurality of hub lug bolts 38 extend generally axially outwardly through the apertures 50 in the axle plate. Often times conical washers 52 (FIGS. 6–8) are used between the lug bolts and the axle plate to facilitate a tight connection of the axle plate to the hub. Lug nuts 54 are used with the hub lug bolts to tighten the axle plate against the hub.

Figure 7:
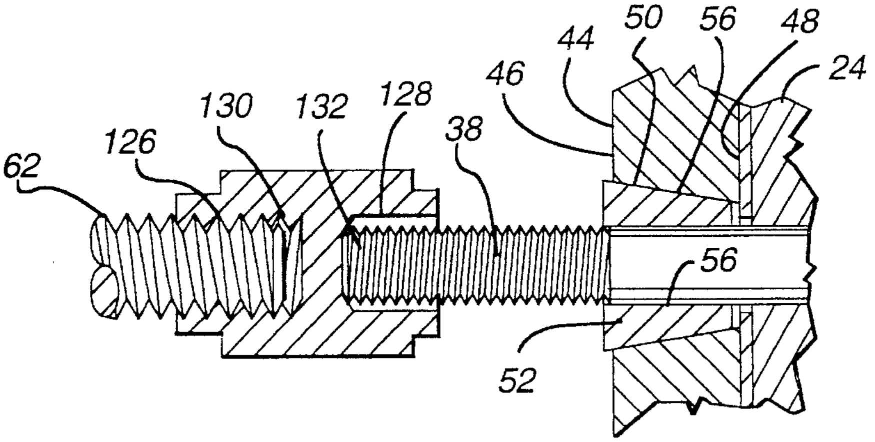
FIG. 7 is an enlarged section taken substantially along the plane of line 7—7 of FIG. 6.

In the event the hub 24, axle 32, or other portions of the drive train of the vehicle become damaged, it is necessary to remove the axle from the wheel assembly 22. In order to remove the axle from the wheel assembly, the hub lug nuts 54 must be removed from the hub lug bolts 38 and the axle must be extracted in an axially outward direction to disengage the axle plate 44 from the hub lug bolts, and also remove the axle shaft 42 from the axial cylindrical cavity 36. The removal of the axle from the wheel assembly is often impeded by the formation of rust-type bonds at the interfaces 56 between the hub lug bolts and the conical washers 52, or between the conical washers and the axle plate, as shown in FIGS. 6 and 7. The various parts may also become mechanically deformed due to the high stress levels in the hub and axle. In any event, the axle plate is frequently difficult to remove from the hub lug bolts.

As shown in FIGS. 1 and 2, the axle puller 20 of the present invention comprises a main body 58 having a plurality of hook-arms 60 pivotally attached thereto and extending axially inwardly. The hook-arms engage the axle plate to allow the axle puller to extract the axle 32 from the wheel assembly. A plurality of circumferentially spaced pushrods 62 are threadedly received in apertures 64 formed in the main body in order to engage the hub lug bolts 38 in a manner to be described in more detail later. A spring-loaded center-driver 66 is movably positioned in an axially aligned bore 68 formed through the center of the main body. The center-driver is biased into an axially outwardly extended position, and is axially movable to percussively impact the axle plate 44 when desired.

Figure 4:
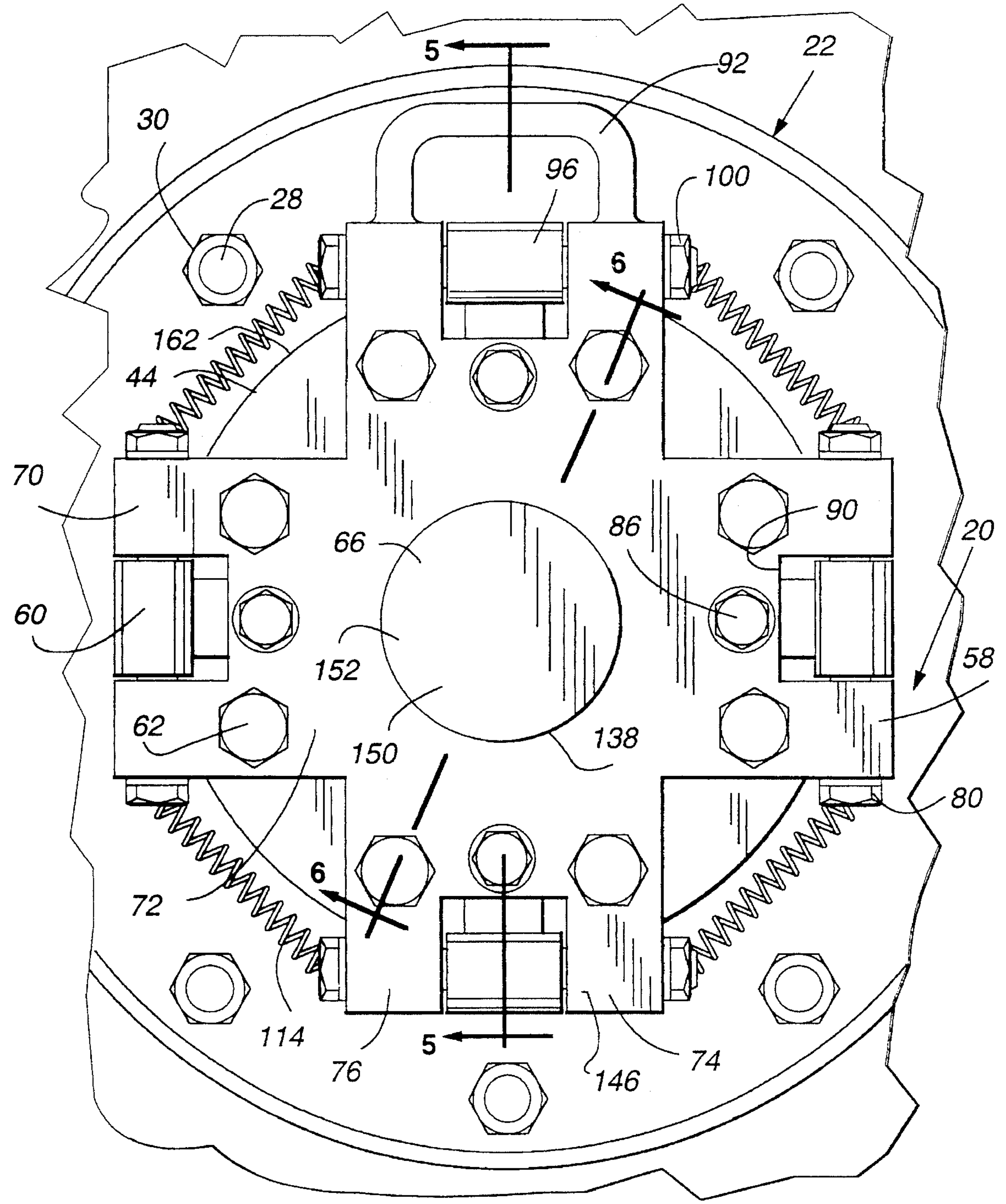
FIG. 4 is an outer end view of the present invention mounted on a wheel assembly.

The main body 58 of the axle puller 20 comprises an equilateral cross-shaped rigid plate 70 and operates as a frame for mounting the other components thereon. The center-driver is journaled in the bore 68, allowing movement only in the axial direction. The cross-shaped main body has four equally spaced radially directed legs 72, each defining a forked bracket 74, as shown in FIGS. 1, 2 and 4. Each forked bracket comprises two tines 76 which are parallel to each other and extend outwardly from the main body. Aligned bores 78 extend through each tine of each forked bracket in a direction along the plane of the main body. The bores associated with each forked bracket receive a pivot pin 80 to pivotally secure an end of an associated hook-arm 60 therein, as further described below.

A plurality of circumferentially spaced bores 64 are formed through the main body 58, in a direction perpendicular to the plane of the main body. Each bore 64 is located at a predetermined radial distance from the central bore 68. A bore liner 82 is removably mounted within each bore, as shown in FIG. 6. The bore liner 82 has a tubular shape with a stop-flange 84 defined at an axially inner end thereof. The bore liner has a threaded internal diameter for adjustably receiving the pushrod 62. The bore liner can be easily replaced in the event the internal threading is stripped, or for any other reason.

A plurality of locking bolts 86 (FIG. 5) are threadedly received in bores 88 formed adjacent to a base 90 of each of the forked brackets 74 on the main body 58. The locking bolts are threadedly attachable to the hook-arms 60 once the hook-arms are in a gripping position, as described below. The locking bolts, once engaged with the hook-arms, keep the hook-arms from slipping off the axle plate 44 and potentially damaging the axle puller 20, the user, or the wheel assembly 22.

A handle 92 (FIG. 2) is rigidly attached to extend above and between the tines 76 of one forked bracket 74 of the main body 58. Typically, the handle is considered the "top" of the axle puller 20, and would be oriented in an upwardly oriented direction during use. The handle provides a convenient location to grip the axle puller 20 for mounting on the wheel assembly.

Each hook-arm 60 has an elongated body defining an axially inner end 94 and an axially outer end 96. The axially outer end has a lateral bore 98 formed therethrough. The hook-arm is pivotally mounted to the main body 58 by placing the axially outer end of the hook-arm between the tines 76 of a forked bracket 74 and inserting a pivot pin 80 through the bore 78 in one tine, through the bore 98 in the axially outer end of the hook-arm, and through the bore 78 in the opposite tine of the same forked bracket. The pivot pin is then secured in place by a fastener 100, such as a nut. The hook-arms 60, because of the pivotal attachment to the main body 58, are capable of pivoting in radially inward and radially outward directions.

The axially inner end 94 of the hook-arm 60 defines a radially inwardly extending substantially triangular shaped lip or protrusion, having a cam surface 104 and a grip surface 106. The cam surface is back-angled so that it faces axially inwardly and yet is also angled radially inwardly. The grip surface extends radially inwardly and faces axially outwardly. When the axle puller 20 is mounted on the wheel assembly 22, the grip surface engages the axially inwardly facing surface 48 of the axle plate 44. Thus, when the hook-arms are moved in an axially outwardly direction the grip surfaces force the axle plate, and as such the axle shaft, to move in the same direction, as will be explained later.

Figure 3:
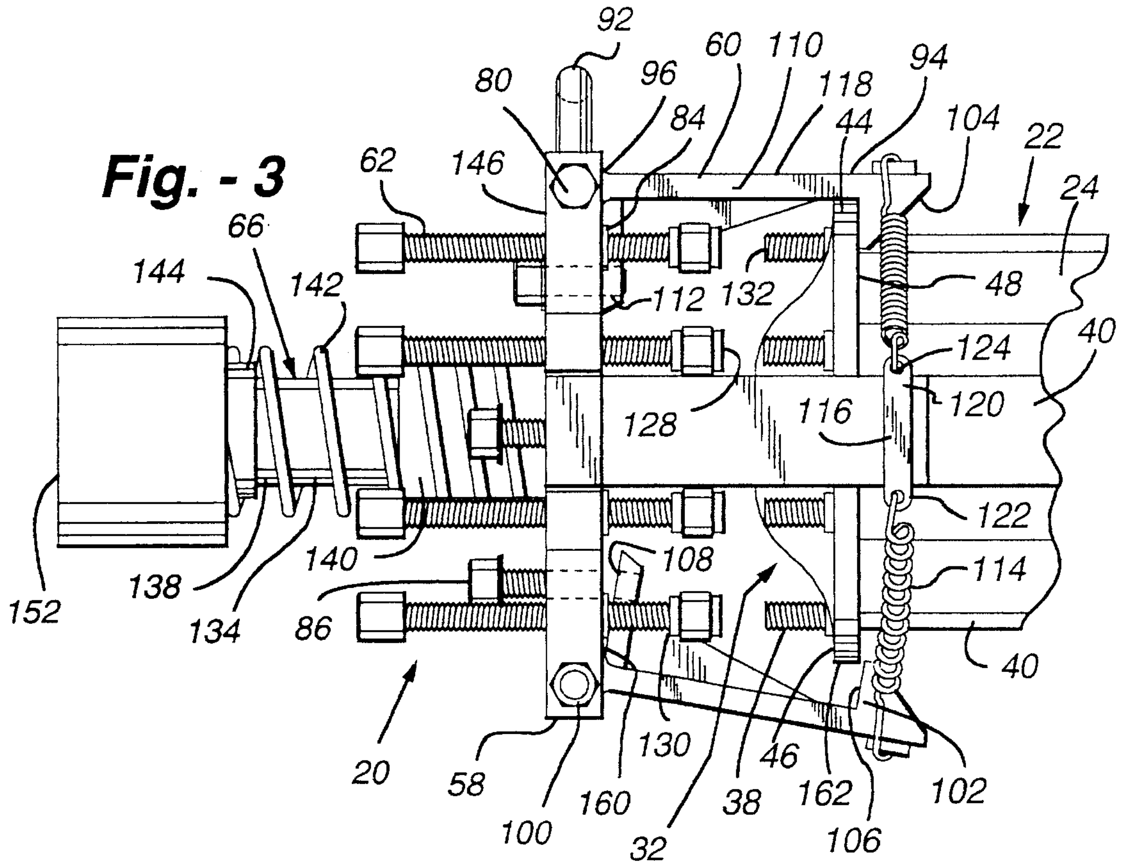
FIG. 3 is a side view of the present invention mounted on a wheel assembly.

An inwardly extending abutment face 108 is attached to the hook-arm 60 proximate to the outwardly extending end 96, as shown in FIG. 3. The abutment face acts to restrict the hook-arms' pivot motion in the radially inwardly direction. The abutment face creates an innermost position 110 when the hook-arm is pivoted radially inwardly. At the innermost position, the abutment face 108 engages the main body 58. At the innermost position 110, the locking bolt 86 is placed through bore 88 in the main body 58 and releasably engages the abutment face, preferably engaging a threaded bore 112 formed in the abutment face.

While the radially inward pivoting motion of the hook-arms 60 is controlled by the abutment face 108, the radially outward pivoting motion is controlled by a plurality of tension springs 114 connecting adjacent hook-arms. A spring retainer arm 116 is mounted on a radially outwardly facing portion 118 of the hook-arm 60, adjacent to the axially inward end 94 of the hook-arm. The spring retainer arm has a flat elongated shape defining a first end 120 and a second end 122, each having an aperture 124 adapted to receive the end of a tension spring. A tension spring is attached between adjacent ends of each of the spring retainer arms between adjacent hook-arms, thus attaching each hook-arm to the two adjacent hook-arms. The spring connection between the hook-arms biases the hook-arms to the innermost position 110, yet yieldingly allows the hook-arms to pivot in a radially outward direction.

Each pushrod 62, due to its threaded mounting, allows for controlled axially inward and outward movement relative to the main body 58. A threaded lead 126 having a cupped or recessed cavity radially inward end 128 is releasably attached to an axially inner end 130 of each pushrod 62 to engage an axially outer end of each hub lug bolt 38. The cupped ends 128 receive the axially outer end of the hub lug bolt and maintain the alignment of the pushrod with the hub lug bolt to avoid accidental disengagement.

The center-driver 66 (FIGS. 2, 5, and 6) comprises a rigid elongated cylindrical rod 134 having an axially inner end 136 and an axially outer end 138. The center-driver is slidably positioned within the centrally located bore 68 of the main body 58. The main body has an axially outwardly extending guide collar 140 (FIGS. 5, 6) attached thereto concentric to the central bore. The guide collar is tubular shaped, and is adapted to assist in journaling the center-driver for axial movement only.

The axially inner end 136 of the center-driver 66 is tapered and adapted to impact the axle plate 44 during removal of the axle 32 from the wheel housing 22 as will be explained later. The tapered end 136 concentrates the force of the impact, and also facilitates convenient removal through the central bore even if the axially inner end mushrooms (physically deforms) after use. The center-driver is case hardened to withstand the force of impacting the axle plate.

The center-driver 66 is biased into an axially outwardly extended position by a compression spring 142 seated between an enlarged head 144 at the axially outer end 138 of the center-driver, and an axially outer face 146 of the main body. The spring pushes at one end against the main body, and at its other end against an annular shoulder 148 defined at the axially inner end of the enlarged head. The axially outer end of the center-driver defines a strike surface 150 which the user strikes to cause the center-driver 66 to impact the axle plate 44. The impact surface preferably has a protective cover 152, such as a rubber cap, to minimize the risk of metal fragments breaking off the center-driver.

A snap ring 154 (FIGS. 5, 6) is positioned in an annular slot 156 formed around the center-driver 66, and has an extension ring 158 attached thereto to provide a diameter larger than that of the central bore 68 in the main body 58. The snap ring acts to limit the axially outward extension of the center driver by engaging an axially inner face 160 of the main body. To remove the center-driver from the main body, the snap ring is removed from the center-driver and the center-driver is pulled in an axially outward direction.

In operation, the axle puller 20 is first mounted on the wheel assembly 22 after the hub lug nuts 54 have been removed from the hub lug bolts 38. In mounting the axle puller on the wheel assembly, a user grips the handle 92 of the axle puller and orients the axle puller such that the cam surfaces 104 of the hook-arms 60 engage the outwardly facing surface 46 of the axle plate 44. At this point the user moves the axle puller in an axially inward direction to cause the cam surfaces of the hook-arms to engage and slide along a peripheral edge 162 of the axle plate, causing the hook-arms to pivot in the radially outward direction (FIG. 3). Once the axle puller has been moved a sufficient distance in the axially inward direction, the cam surfaces disengage from the outer surface of the axle plate. The tension springs 114 bias the hook-arms to their innermost position 110, allowing the grip surface 106 to engage the axially inwardly facing surface 48 of the axle plate 44.

The locking bolts 86 are next threaded into the hook-arms 60 to lock the hook-arms in the innermost position. The locking bolts keep the hook-arms from pivoting outwardly and slipping off the axle plate 44. Once the hook-arms have been fixed in position by the lock bolts, the pushrods 62 are axially inwardly adjusted to engage the axially outward end 132 of the hub lug bolts 38. For optimum performance, a pushrod engages each hub lug bolt. The pushrods are then further adjusted in the axially inward direction placing an outward bias on the main body 58, thus biasing it away from the hub 24 and the axle plate and establishing an extraction force around each of the hub lug bolts. By engaging each of the hub lug bolts, an extraction force is applied to each unwanted bond that impedes the removal of the axle.

The extraction force acts upon the rust or other unwanted connection bond at the interfaces 56 of the lug bolt and the conical 52 washer, or the conical washer and the axle plate 44. Once a sufficient extraction force has been applied to each of the hub lug bolts 38 using the pushrods 62, the forces established may be sufficient to break the rust bonds and extract the axle 32 from the wheel assembly 22. However, if the rust bonds are severe, an added force may be necessary to obtain the release of the axle 32 from the wheel assembly. In this situation, the center-driver 66 can be used to percussively impact the outer surface 46 of the axle plate. Because the rust bonds are biased under a constant extraction force caused by the hook-arms 60 pulling the axle axially outwardly and the pushrods pushing the wheel assembly axially inwardly, the percussive impact is usually sufficient to jolt or jar the rust bonds and cause them to fail.

While the center-driver 66 may be effective without any extraction force being applied to the hub lug bolts 38 and the axle plate 44, the center-driver is most effective when the pushrods 62 are used to apply an extraction force to the hub lug bolts and the axle plate sufficient to set up shear and tensile forces in the rust bonds between the hub lug bolts, axle plate and the conical washers.

After the rust bonds have failed, the axle puller 20 can be withdrawn in an axially outward direction to pull along with it the axle plate 44 and axle shaft 42. The axle puller can also be removed by disengaging the hook-arms 60 from the axle plate prior to removing the axle 32 from the wheel assembly.

Although the present invention has been described with a certain degree of particularity, it is understood that changes in detail or structure may be made without departing from the spirit of the invention, as defined in the appended claims.

I claim:

1. An axle puller for removing an axle from a wheel assembly, the axle having an axle plate fixed to an axle shaft extending axially of the wheel assembly, the axle plate defining a plurality of apertures, and the wheel assembly having a hub and an axle housing fixed to a vehicle and defining an axial cylindrical cavity for slidably receiving the axle shaft, a plurality of lug bolts affixed to and extending axially outwardly from the hub, each-having an axially outer end; the axle plate being positioned axially outwardly from the hub and the lug bolts extending through the apertures in the axle plate when the axle shaft is inserted into the cylindrical cavity, the axle plate having an axially inner surface proximate to the hub, and an axially outer surface facing outwardly from the hub, the axle puller comprising in combination:

a. a main body arranged to be positioned axially outwardly of the axle plate;

b. a plurality of hook-arms, each with an axially inner end and an axially outer end, said axially outer ends being pivotally attached to said main body, said axially inner ends each defining a radially inwardly extending protrusion, said protrusion engaging the axially inner surface of the axle plate to operably and releasably attach the main body to the axially inner surface of the axle plate, and wherein said axially inner ends of said hook-arms are resiliently biased to a radially inner position defined by contact with said axle plate; and c. axially adjustable means attached to the main body for engaging at least one lug bolt and biasing the main body axially away from the axle plate to separate the axle plate from the hub.

2. An axle puller as defined in claim 1, further comprising means for maintaining engagement of said hook-arms with the axle plate.

3. An axle puller as defined as defined in claim 1 wherein said axle inner ends define a radially inwardly facing cam surface to engage said axle plate and move said hook arms initially radially outwardly to allow said protrusions to contact said inner surface of said axle plate.

4. An axle puller for removing an axle from a wheel assembly, the axle having an axle plate fixed to an axle shaft extending axially of the wheel assembly, the axle plate defining a plurality of apertures, and the wheel assembly having a hub and an axle housing fixed to a vehicle and defining an axial cylindrical cavity for slidably receiving the axle shaft, a plurality of lug bolts affixed to and extending axially outwardly from the hub, each having an axially outer end; the axle plate being positioned axially outwardly from the hub and the lug bolts extending through the apertures in the axle plate when the axle shaft is inserted into the cylindrical cavity, the axle plate having an axially inner surface proximate to the hub, and an axially outer surface facing outwardly from the hub, the axle puller comprising in combination:

a. a main body arranged to be positioned axially outwardly of the axle plate;

b. a plurality of hook-arms, each with an axially inner end and an axially outer end, said axially inner ends each defining a radially inwardly extending protrusion, said protrusion engaging the axially inner surface of the axle plate to operably and releasably attach the main body to the axially inner surface of the axle plate; and c. a plurality of elongated cylindrical pushrods adjustably inserted through a plurality of corresponding bores formed in said main body, said bores being axially aligned with the lug bolts of the hub, and an axially inner end of said pushrods, each defining a recessed cavity to releasably receive and center the axially outer end of the corresponding lug bolts, to bias the main body axially away from the axle plate to separate the axle plate from the hub.

5. An axle puller for removing an axle from a wheel assembly, the axle having an axle plate fixed to an axle shaft extending axially of the wheel assembly, the axle plate defining a plurality of apertures, and the wheel assembly having a hub and an axle housing fixed to a vehicle and defining an axial cylindrical cavity for slidably receiving the axle shaft, a plurality of lug bolts affixed to and extending axially outwardly from the hub, each having an axially outer end; the axle plate being positioned axially outwardly from the hub and the lug bolts extending through the apertures in the axle plate when the axle shaft is inserted into the cylindrical cavity, the axle plate having an axially inner surface proximate to the hub, and an axially outer surface facing outwardly from the hub, the axle puller comprising in combination:

a. a main body arranged to be positioned axially outwardly of the axle plate, said main body defining a central bore;

b. a plurality of hook-arms, each with an axially inner end, said axially inner end defining a radially inwardly extending protrusion, said protrusion engaging the axially inner surface of the axle plate for operably and releasably attaching the main body to the axially inner surface of the axle plate; and c. a plurality of elongated cylindrical pushrods adjustably inserted through a plurality of corresponding bores formed in said main body, said bores being axially aligned with the lug bolts of the hub, and an axially inner end of said pushrods engaging the corresponding lug bolts for engaging at least one lug bolt and biasing the main body axially away from the axle plate to separate the axle plate from the hub; and d. an elongated center-driver slidably mounted in said central bore of the main body for percussively impacting the axle plate.

6. An axle puller as defined in claim 5 wherein said center-driver is resiliently biased in an axially outer position.

* * * * *